United States Patent [19]
De Ruyter et al.

[11] 3,978,951
[45] Sept. 7, 1976

[54] SYNCHRONIZATION APPARATUS FOR SPEED-CHANGING GEARING OR TRANSMISSIONS, ESPECIALLY FOR VEHICLES

[76] Inventors: Jackie Andre De Ruyter, L'Escalade C2 no. 307, Saint Julien en Genevois, France, 74160; Jean-Claude Caveng, ch. du Mont-Blanc 8, 1224 Chene-Bougeries, Switzerland

[22] Filed: May 27, 1975

[21] Appl. No.: 580,588

[30] Foreign Application Priority Data
May 28, 1974 France .................. 74.19639
Jan. 13, 1975 France .................. 75.1852

[52] U.S. Cl. ........................... 192/53 C
[51] Int. Cl.² ......................... F16D 23/06
[58] Field of Search ........... 192/53 A, 53 C

[56] References Cited
UNITED STATES PATENTS

| | | | |
|---|---|---|---|
| 2,932,373 | 4/1960 | Schmid | 192/53 A |
| 3,200,920 | 8/1965 | Reich | 192/53 C |
| 3,633,716 | 1/1972 | Gortz | 192/53 C |
| 3,744,604 | 7/1973 | Austen | 192/53 C |

FOREIGN PATENTS OR APPLICATIONS

| | | | |
|---|---|---|---|
| 1,273,347 | 8/1961 | France | 192/53 C |
| 1,013,178 | 8/1957 | Germany | 192/53 A |

*Primary Examiner*—Allan D. Herrmann
*Attorney, Agent, or Firm*—Werner W. Kleeman

[57] ABSTRACT

A synchronization apparatus for speed-changing gearing or transmissions, especially for vehicles, comprising a slotted synchronization ring arranged between a claw support and a gear shift sleeve. A blocker or blocking body supported for radially outward movement by the claw support, the blocker body engaging with play by means of an entrainment cam or dog in the slot of the aforesaid ring. The synchronization ring during the synchronization function bearing by means of one of its ends at the entrainment cam in the direction of the relative rotation to be compensated between the claw support and the gear shift sleeve. The blocker body and the synchronization ring possessing stops coacting with one another such that they can pass or travel over one another, these stops or impact means are arranged in the direction of the relative rotation to be compensated after the entrainment cam and can be brought into operable engagement with one another by radially shifting the blocker body.

9 Claims, 5 Drawing Figures

SYNCHRONIZATION APPARATUS FOR SPEED-CHANGING GEARING OR TRANSMISSIONS, ESPECIALLY FOR VEHICLES

BACKGROUND OF THE INVENTION

The present invention relates to a new and improved construction of synchronization apparatus for speed-changing gearing or transmissions —also sometimes referred to in the art as change-speed gearing—, particularly for vehicles or the like, comprising a slotted synchronization ring arranged between a claw or jaw support and a gear shift sleeve and a blocker body supported for radially outward movement at the claw support, and wherein the blocker body engages with play by means of an entrainment cam in the slot of the synchronization ring. Further, the synchronization ring during the synchronization function bears with one of its ends at the entrainment cam in the direction of the relative rotation which is to be compensated or equalized between the claw support and the gear shift sleeve.

Synchronization devices of this type basically operate in accordance with the principle of internal expanding jaw brakes. In fact the ring which is supported via one of its ends during the synchronization operation constitutes a brake jaw which bears from the inside against the gear shift sleeve corresponding to the brake drum. Stated in a more precise manner, the synchronization ring corresponds to a primary jaw or override jaw in that the friction related to the support brings about a radially outwardly effective moment and generally strives to open the synchronization ring, so that the same is pressed with a greater force against the gear shift sleeve than would be possible owing to its inherent elasticity.

According to the synchronization apparatus which has become known to the art from German patent publication No. 1,013,178 the servo action of the synchronization ring is increased in that the blocker body bears against impacts or stops of the claw support which are inclined with respect to the radial direction, and thus, is pressed by means of a work surface from the inside against the end which is free during the synchronization operation, i.e. against the abutting or so-called run-on end of the synchronization ring. Even the servo action which is increased without question with this arrangement is not sufficient to prevent a premature overtraveling or overriding of the synchronization ring.

Apparently in recognition of the aforementioned operation of this prior art synchronization apparatus there was developed a further state-of-the-art synchronization apparatus as taught in French Pat. No. 1,340,944 which likewise is based upon the principle of a friction brake and is constituted by a combination of an internal expanding brake and an external contracting band brake or outer band brake. With this prior art equipment during the synchronization operation a synchronization ring segment acting as an internal expanding brake jaw bears upon the end of a further synchronization ring functioning as a brake band or lining. Such prior art apparatus is complicated and possesses all of the therewith associated drawbacks. Also it does not provide any protection against a premature overriding of the synchronization.

SUMMARY OF THE INVENTION

Hence, with the foregoing in mind, it is a primary object of the present invention to provide a new and improved construction of synchronization apparatus for change-speed gearing or the like, especially for vehicles, which is not associated with the aforementioned drawbacks and limitations of the prior art proposals.

Another and more specific object of the present invention aims at the provision of a new and improved construction of synchronization apparatus wherein the premature overriding of the synchronization ring is practically eliminated in any event, and thus also then when the gear shift sleeve is pressed especially intensely against the synchronization ring in order to reduce the time required for synchronization.

In keeping with the foregoing and to attain the last-mentioned objective it is a further object of the invention to transform the synchronization ring into a rigid structure until attaining synchronization, and which rigid structure is not only capable of resisting the effort of the gear shift sleeve to reduce the ring diameter, not only within the framework of the elasticity of the synchronization ring and the thereafter exerted frictional force, but to generally resist such effort.

Now in order to implement these and still further objects of the invention, which will become more readily apparent as the description proceeds, the synchronization apparatus of this development is manifested by the features that the blocker body and the synchronization ring possess overtraveling coacting stops or impact members which are arranged after the entrainment cam in the direction of the relative rotation which is to be equalized or compensated and can be brought into operable engagement with one another through radial shifting of the blocker body.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE INVENTION

Figure 1:
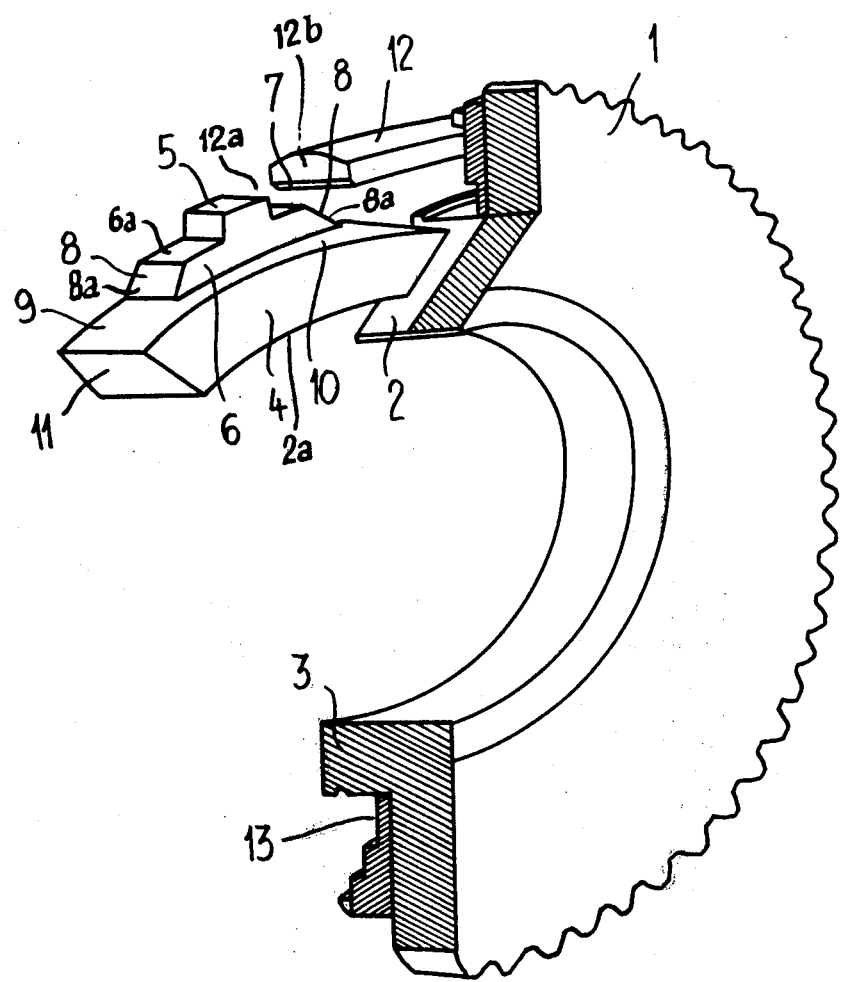
FIG. 1 is a perspective view, partially in cross-section of a first exemplary embodiment of the invention.
Figure 3:
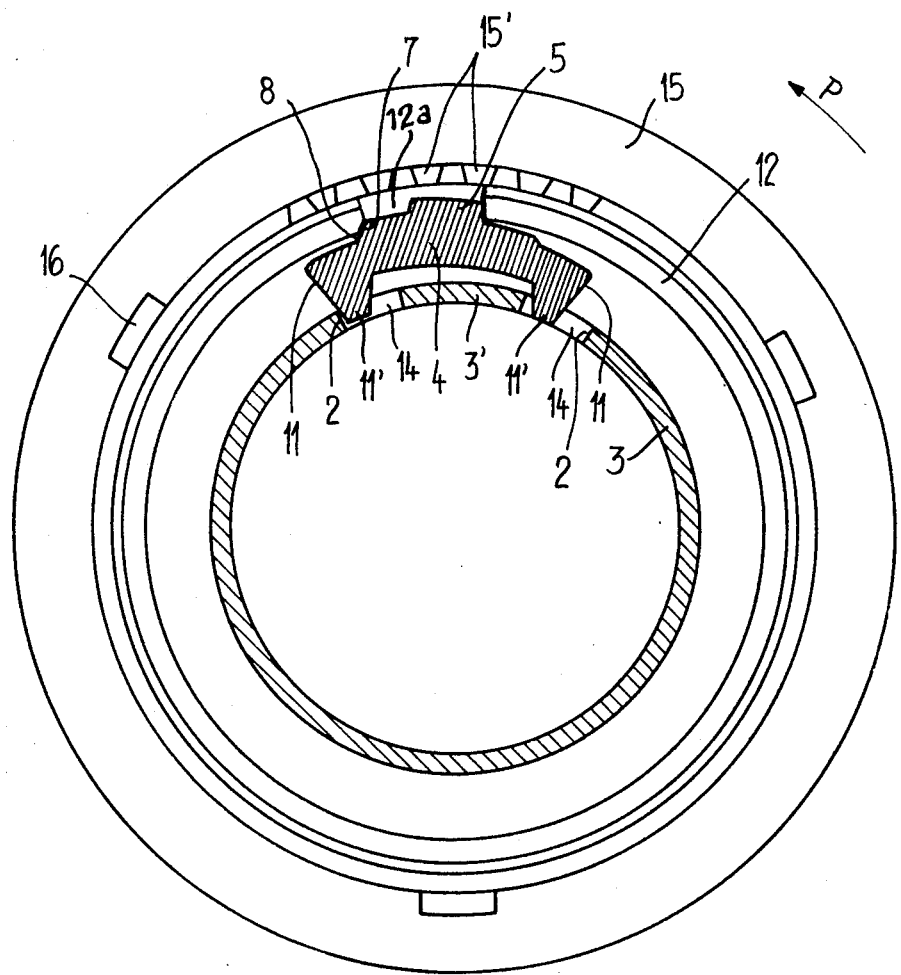
FIG. 3 is a variant embodiment in end view, corresponding basically to the embodiment of FIG. 2, and again partially in cross-section, depicting the components during the synchronization operation.

Describing now the drawings, in FIG. 1 there is illustrated the claw or jaw support viewed from its side facing away from the gear shift sleeve which is not here illustrated, but for instance may be like the gear shift sleeve 15 shown in FIG. 3. At a substantially annular or ring-shaped projection 3 of the claw support 1 there are provided supporting or support surfaces (in the drawing there is only visible the support surface 2) and which support surfaces are formed by a recess of such projection 3. These support surfaces 2 confront one another and in accordance with their inclined position form a radially outwardly widening intermediate space or compartment, generally indicated by reference character 2a. Between the support surfaces 2 (this reference character is intended to be applicable for both support surfaces) there is located a blocker or blocking body 4 which bears at the support surfaces 2 by means of its appropriate end support surfaces 11 (again in the drawing only one such support surface 11 is completely visible). Consequently, the one or the other end of the blocker body 4 is forced radially outwards when there occurs a relative movement in the peripheral direction between the claw support 1 and the blocker body 4. The indicated mobility of the blocker body 4 is limited by its peripheral edge or marginal portion 10 which engages in an annular or ring-shaped groove 13 of the claw support or carrier 1. At the circumferential or periphal surface 9 of the blocker body 4 there is located a stepped projection or protuberance 6 which engages with play by means of an entrainment cam or dog 5 in a slot 12a of the synchronization ring 12 and by means of its portions or sections 6a which laterally merge at the entrainment cam 5—as such will be more fully explained hereinafter—normally engage beneath the terminal sections of the synchronization ring 12. The projection 6 together with its surfaces 8a which are directed in the peripheral direction towards the one and the other side, respectively, and are inclined in the direction of the entrainment cam 5, as shown, form stop or impact members 8 which cooperate with appropriately formed counter-stops or impact members 7 of the synchronization ring 12. These counter-stops 7 are formed at the ends of such ring 12 by beveled or inclined portions, generally indicated by reference character 12b.

Figure 2:
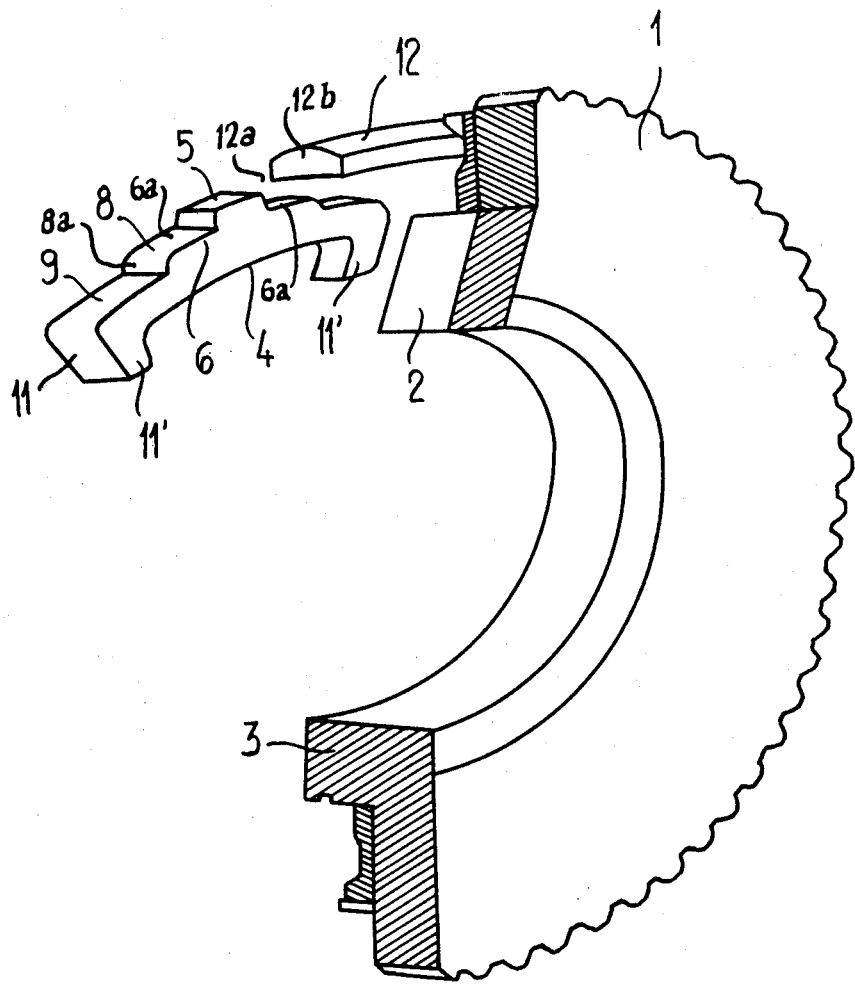
FIG. 2 also is a perspective view, partially in cross-section, of a second exemplary embodiment of the invention.

The exemplary embodiment depicted in FIG. 2 differs from that according to the showing of FIG. 1 only in the construction of the blocker body 4. Hence, generally corresponding components have been conveniently designated with the same reference characters. Under these circumstances it is sufficient for this constructional variation that there are arranged cams or dogs 11' at both ends of the blocker body 4 which possesses the same width throughout, these cams 11' possessing the support surfaces 11. As will be recognized by inspecting FIG. 3—which only basically corresponds to FIG. 2, however not in unessential details or in scale—the cams 11' engage in recesses or bores 14 of the ring projection 3 which in this case is shown in section, and a web 3' of the ring projection 3 which remains between the recesses 14 can serve as a support for the blocker body 4.

In the showing of FIG. 3 there will also be recognized the gear shift sleeve 15 which in conventional manner is held for displacement in axial direction at the sliding webs 16 of a sleeve support which is not shown in the drawing and which sliding webs engage in grooves of the gear shift sleeve. The claw support has likewise not been shown in FIG. 3 in order to preserve clarity in illustration, yet it is here represented by its ring projection 3. The teeth 15' of the gear shift sleeve 15, as viewed from the observer, are located behind the synchronization ring 12, so that during shifting, i.e. when the gear shift sleeve 15 is moved in the direction towards the observer, they engage at the arched or domed peripheral surface of the synchronization ring 12. In order to free the path for the gear shift sleeve 15 the synchronization ring 12 is somewhat compressed together in accordance with its outer diameter which in the relaxed condition of the inner diameter exceeds or ascends over the teeth of the gear shift sleeve.

Now if the teeth 15 of the gear shift sleeve engage at the synchronization ring 12, then this synchronization ring 12 is entrained between the gear shift sleeve and the claw support in the direction of the relative movement —here indicated by the arrow P. By means of its end which is the rear end as considered with respect to the direction of rotation P the synchronization ring 12 bears against the entrainment cam 5 of the blocker body 4, which, in turn, bears by means or its support surface 11 at the associated support surface 2 of the claw support, and which support surface 11 constitutes the forward or front support surface with respect to the direction of rotation P. In this relative position of the synchronization ring 12 and the blocker body 4 the stop or impact member 8 of the blocker body 4 —and which stop or impact member 8 is located forwardly with respect to the rotational direction P— can be brought into engagement through radial shifting or displacement with the counter stop or impact member 7 of the synchronization ring 12. This can basically occur solely with the aid of the centrifugal force, namely then when the support surfaces 11 and 2 extend in radial or almost radial direction. If, however, these support surfaces are inclined (as such is the case for the embodiment shown in FIG. 1), then such support surfaces exert a repelling action upon the relevant end of the blocker or blocking body 4. In any event the blocker body 4 assumes an operative or working position which is tilted in relation to its normal position and under the action of the frictional force exerted upon the synchronization ring bears at the supporting or support surface 2 of the ring projection 3.

The stop or impact members 7 and 8 by virtue of their inclined configuration are constructed as over-traveling or overriding stop members i.e. these stop members can travel over one another. Hence, the radially inwardly directed pressure exerted by the gear shift sleeve 15 completely about the synchronization ring 12 strives to tilt the blocker or blocking body 4 out of its illustrated working or operative position. Opposing such is the contact force or pressure between the support surfaces 11 and 2, particularly when such surfaces are directed more or less at an inclination. Under these circumstances the blocker or blocking body 4 with its entrainment cam 5 and its stop or impact means 8 functions in the manner of a locking bolt or lock which is inserted in the slot 12a of the synchronization ring, which then transforms the elastically resilient synchronization ring 12 into a rigid structure which is incapable of contracting to a smaller diameter and freeing the paths for the gear shift sleeve 15 and the teeth 15' thereof, respectively. This is also then the case when the gear shift sleeve 15 is pressed with increased force against the synchronization ring 12. Indeed the blocking force increases as a function of the shifting or switching force acting upon the gear shift sleeve 15. This means, however, that it is possible to generate a really great friction between the teeth of the gear shift sleeve and the synchronization ring, and thus, to bring about in a correspondingly shortened time the synchronization.

If this is the case then there is a reduction of the contact force between the support surfaces 11 and 2 —in certain instances these surfaces are in fact completely relieved or raised from one another—, so that the impact members or stops 7 and 8 can be overtraveled under the action of the pressure exerted completely about the synchronization ring 12 by the gear shift sleeve 15 with simultaneous reduction of the ring diameter. The blocker or blocking body 4 is tilted back out of its work position and the gear shift sleeve 15 can be displaced over and past the synchronization ring 12 and brought into engagement with the claw support. This condition has been shown in FIG. 4.

What has been stated above is analogously applicable with the reverse sign, that is to say, if the direction of the relative rotation between the gear shift sleeve and the claw support is opposite the direction of the arrow P. Situations can arise wherein the direction of the relative rotation remains unchanged under normal operating conditions. Under these conditions it would be possible to correspondingly simplify the construction of the blocker body.

Figure 4:
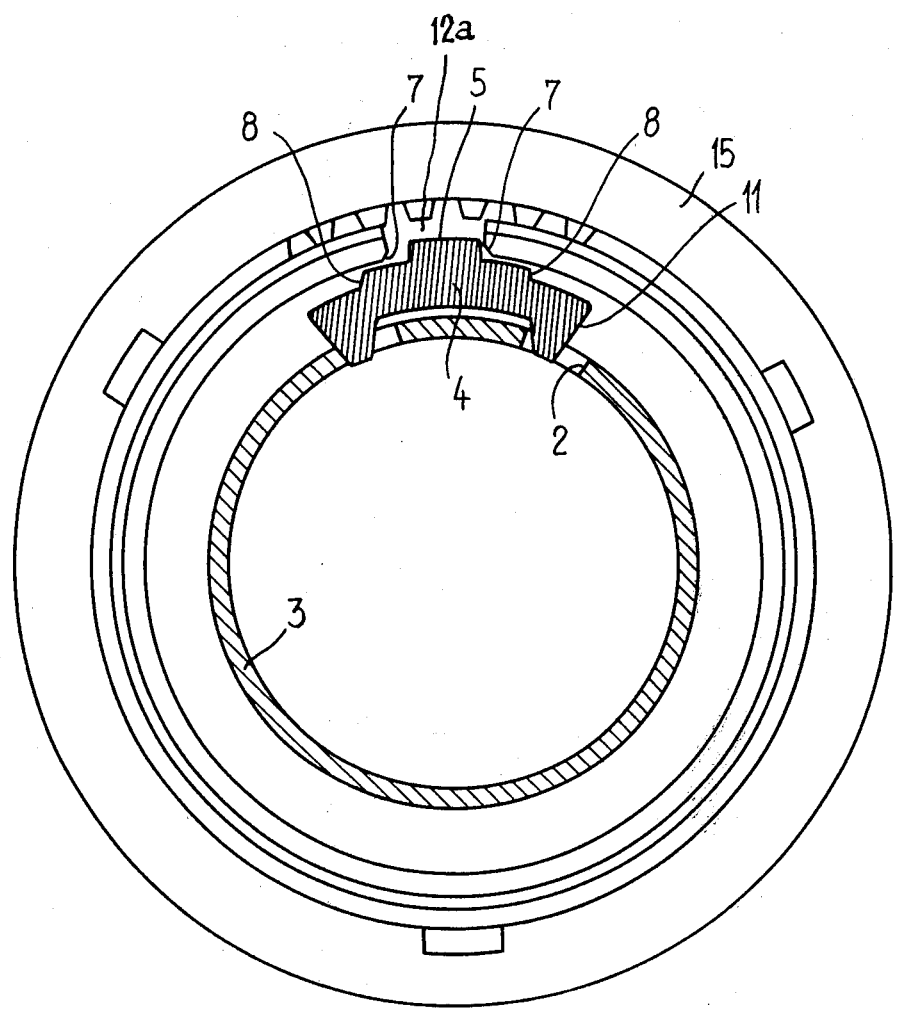
FIG. 4 illustrates the synchronization apparatus portrayed in FIG. 3, however after the gear shift sleeve has been brought into engagement with the claw or jaw support.
Figure 5:
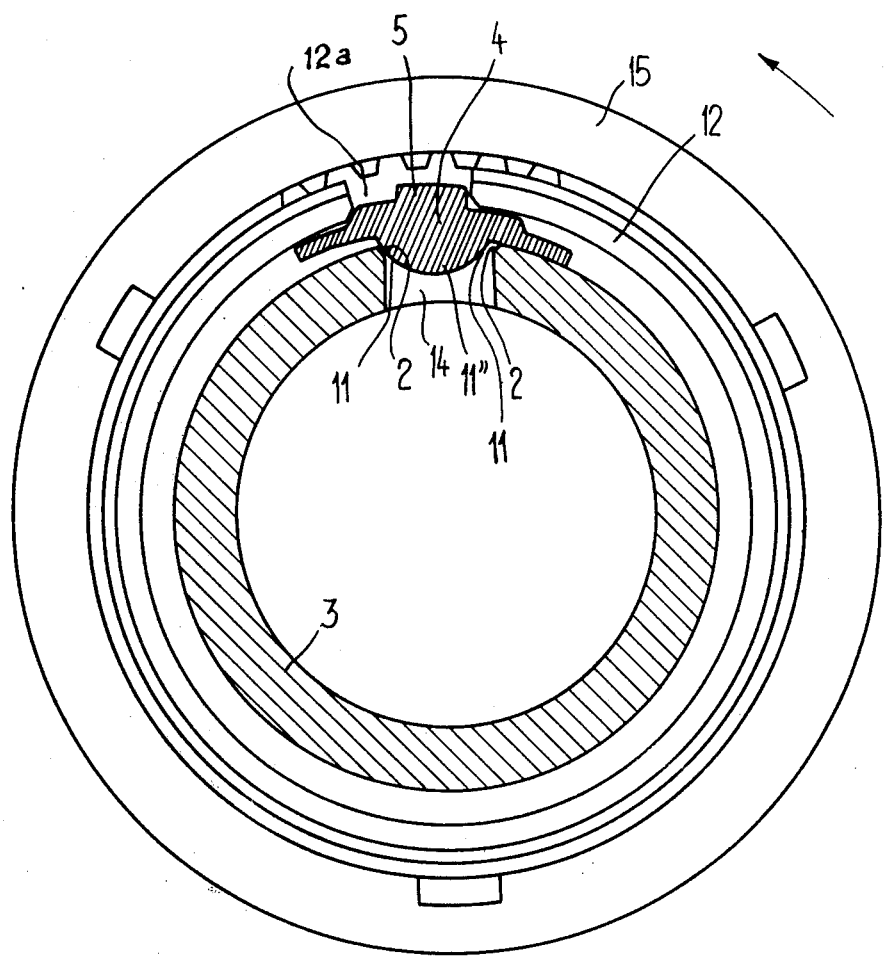
FIG. 5 is a further variant embodiment of the invention, illustrated in a manner corresponding to the showing of FIG. 3 and with the components in the same operating position.

As was already the case with respect to FIG. 4, also in FIG. 5 there has been employed only a number of the previously used reference characters for the corresponding components, wherein the explanations given hereinafter are limited to the differences from the previously discussed embodiments. With this embodiment the blocker or blocking body 4 possesses at its intermediate region a single circular disk-shaped cam 11″ which engages in a recess or bore 14 of the ring projection 3. The support surfaces 11 of the cam 11″ which are facing away from one another coact with confronting support or supporting surfaces 2 of the ring projection 3. The mode of operation of such apparatus coincides to that already described in conjunction with the embodiments portrayed in FIGS. 1 to 3. FIG. 5 illustrates the apparatus during the synchronization work or operation. There will be here recognized particularly clearly —and it is to be mentioned also having the same applicability for the remaining constructional embodiments— that the blocker body during this phase is supported by means of its stepped end from the inside against the one end of the ring 12. In this manner there is also realized an intensification of the blocking action.

It should be understood that the illustrated basic concept can be realized in a number of other variations. For instance, conceptually it would be possible to construct the blocker body not as a one-piece member, rather that the same is constructed to possess radially outwardly movable stops or impact members which then would be brought into engagement with the counter-stops of the ring, for instance by means of splines or the like provided at the ring projection 3. It would also be possible to arrange the counter-stops of the ring to be rearwardly shifted or offset with respect to the ring ends. Of course, in contrast to such constructional embodiments the illustrated variant embodiments and correspondingly similar embodiments possess the advantage that they do not require any additional components.

From what has been disclosed above it can be stated in summation that the blocker body, during the synchronization operation, engages in the manner of a locking bolt or lock in the slot of the synchronization ring and converts such into a rigid structure. On the other hand, when synchronization is reached the blocker body can be forced out of the slot, so that the synchronization ring contracts together and immerses into the internal teeth of the gear shift sleeve. The blocking action enables exerting an increased shifting force. This again leads to a shortening of the time needed for bringing about synchronization. There is practically eliminated a premature overtraveling or overriding of the synchronization.

While there is shown and described present preferred embodiments of the invention, it is to be distinctly understood that the invention is not limited thereto, but may be otherwise variously embodied and practiced within the scope of the following claims.

Accordingly, what is claimed is:

1. A synchronization apparatus for speed-changing gearing, especially for vehicles, comprising a claw support and a gear shift sleeve, a slotted synchronization ring possessing a slot, said slotted synchronization ring being arranged between said claw support and said gear shift sleeve, a blocker body supported by the claw support for carrying out a radial outward movement, said blocker body possessing an entrainment cam, said blocker body engaging with play by means of the entrainment cam in the slot of the synchronization ring, said synchronization ring having an end which bears against the entrainment cam during the synchronization operation in the direction of the relative rotation which is to be equalized between the claw support and the gear shift sleeve, said blocker body and said synchronization ring possessing stops coacting with one another such that they can travel over one another, said stops being arranged after the entrainment cam in the direction of the relative rotation which is to be equalized and can be brought into engagement with one another by radially shifting the blocker body.

2. The synchronization apparatus as defined in claim 1, wherein at least one of the cooperating stops possesses an impact surface which is rearwardly inclined in the direction of the relative rotation to be equalized.

3. The synchronization apparatus as defined in claim 2, wherein the blocker body comprises a stepped body portion for forming the stops.

4. The synchronization apparatus as defined in claim 3, wherein the stepped body portion of the blocker body can be brought into engagement with an end of the synchronization ring which is freed during the synchronization operation.

5. The synchronization apparatus as defined in claim 1, wherein the blocker body and the claw support are supported against one another in the direction of the relative rotation which is to be equalized at support surfaces which radially outwardly deflect the blocker body during the synchronization operation.

6. The synchronization apparatus as defined in claim 5, wherein the claw support possesses a ring projection which engages radially from the inside beneath the blocker body, said ring projection being positively coupled with the blocker body in the direction of the relative rotation which is to be equalized by the support surfaces.

7. The synchronization apparatus as defined in claim 5, wherein the claw support is provided with a ring projection, said ring projection being provided with a respective recess, the blocker body possessing at each of its ends a cam having a support surface, each said cam with its support surface engaging in a respective one of the recesses of the ring projection.

8. The synchronization apparatus as defined in claim 5, wherein the claw support possesses a ring projection having a recess, the blocker body having an intermediate portion possessing a projection provided with support surfaces engaging in the recess of the ring projection.

9. The synchronization apparatus as defined in claim 8, wherein said projection possesses the form of a substantially circular disk-like segment.

* * * * *